Patented Jan. 7, 1941

2,227,770

UNITED STATES PATENT OFFICE 2,227,770

COMPOSITE GLASS AND CERAMIC ARTICLE

Alfred Ungewiss, Berlin-Grunewald, Germany, assignor to Steatit-Magnesia Aktiengesellschaft, Berlin-Pankow, Germany No Drawing. Application December 10, 1936, Serial No. 115,125. In Germany December 14, 1935

10 Claims. (Cl. 49—92)

This invention relates to a process of producing apparatus composed of glass and molded ceramic bodies, and has for its object to prepare combinations of materials of this kind that are considerably improved with respect to the strength and reliability of the connection of the parts.

It has been proposed already to produce physical apparatus from a combination of parts consisting of ceramic material, such as porcelain and steatite, and of glass parts by connecting the ceramic part with the glass parts by direct fusion. This joining by fusion is chiefly applied in the construction of vacuum apparatus of every description. Owing to its special dielectric properties or its high fusion point, the ceramic part is inserted at certain points of the apparatus where it insures also vacuum-tight closure relative to the outer air.

One of the drawbacks of these known combinations, however, is that the vitrified ceramic substances mentioned sometimes possess sporadic pores or air inclusions which through very fine connections extend to the surface. From these pores slow after-generation of gas may take place and in the course of time impair the vacuum. A further difficulty is that the combination of vitrified molded ceramic bodies with glasses requires a very extensive adaptation of the behavior of both substances as to expansion, whereby the selection of usable glasses or ceramic substances is much restricted in each instance. At any rate, molded vitrified ceramic bodies are always somewhat endangered by the heat stresses due to fusion. In view of these facts, the range of glasses that can be used in combination with molded vitrified ceramic bodies of the kind described is limited to those having a relatively low coefficient of expansion, particularly hard and medium hard glasses, whilst it is often desirable to be able to use also glasses of a higher coefficient of expansion, such as soft glasses, lead glasses or fusible glasses, for the purposes stated.

The invention eliminates these difficulties and provides many new possibilities of manufacture by employing as ceramic constituent of such combinations porous ceramic materials. Such porous materials are of course not vacuum-tight per se, but in case vacuum-tightness is required, this can be easily attained by coating the porous material with a tightly closing glaze or, still better, regularly flashing it with glass. Sealing is then effected by an outer glass layer, and the other functions of the ceramic part are carried out by the porous body which is exposed towards the inside of the tube.

The use of porous material permits much greater freedom in the choice of glasses that can be employed in fusing and particularly makes it possible to carry out the fusion process without special precautions. Compared with dense molded ceramic bodies, porous bodies of a porosity of 10 to 40 per cent by volume possess much greater stability in case of temperature variations, so that slow heating and cooling during fusing can be dispensed with. When these porous bodies are employed in vacuum apparatus, complete evacuation is furthermore greatly facilitated. The pores are so disseminated in these porous ceramic bodies that relatively large communications remain open through the entire body and prevent slow after-generation of gas from the very start.

Particularly suitable masses for forming the molded porous bodies are those that contain at least 20% highly refractory, especially pure highly refractory, oxides of the alkaline earths or earth metals or mixtures thereof. As plasticizers there may be used clay body and/or the hydroxide of the refractory oxide used, for instance magnesium hydroxide and/or aluminium hydroxide or mixtures thereof.

As the examples given below indicate, such batches yield ceramic masses which at a baking temperature of 1300° to 1400° C. disclose porosities of 30 per cent by volume on the average. The mechanical strength is still perfectly satisfactory. If, according to the invention, as refractory oxides, magnesium oxide and alumina in the form of spinel $MgO.Al_2O_3$, or of another compound of the mixed crystal series $MgO-Al_2O_3$, are used, the masses obtained will have a somewhat lower porosity than the first mentioned ones, but they will be distinguished by a considerable further improvement in strength and particularly by lower dielectric losses compared with the others.

In harmony with the last-mentioned knowledge is the finding that if the ceramic bodies consist to an essential and property-determining degree of spinel the object of the invention is attained also when such bodies are fully vitrified. Such spinel bodies have a relatively high thermal coefficient of expansion, amounting from $8 \times 10^{-6}$ to $11 \times 10^{-6}$ in the temperature range of 300° C. to 800° C., and therefore can be fused onto soft glass having a high thermal coefficient of expansion. Such soft glass can be satisfactorily fused onto ordinary low-expansion ceramic material only when such material is porous, as previously pointed out. Furthermore, the special advantage afforded by such masses produced by employing as addition other customary plasticizers, such as clay body, bentonite and soapstone, possibly in combination with flux such as lime, barium oxide, feldspar or feldspar-like minerals, and by baking at 1300° to 1500° C. are, apart from high mechanical strength, excellent dielectric properties, especially since spinel as a substance composed of pure refractory oxide possesses superior insulating properties.

A particularly effective increase of the coefficient of expansion is attained in such masses, when, in addition to an ample amount of spinel, MgO in uncombined form is introduced. Such masses can be built up from spinel and MgO or MgO (OH)$_2$ with or without the addition of plasticizers and fluxes.

To the first-described porous masses acid constituents, preferably silicic acid, may be added, whereby at the grain boundaries superficial reaction is produced which assists in strengthening the mass. The invention further makes possible also the use of masses consisting of alkaline earth silicates, provided components are added which at firing temperatures between 1300° and 1400° C. prevent vitrifaction. This can be attained by adding a portion of silicic acid or a portion of the alkaline earth oxide concerned. Preferably, both are used in the form of hydroxides, whereby additional plasticity and thus better workability of the mass is attained while porosity is increased. It has been found that the amount of excess silicic acid should be at least 20% of a batch containing for instance magnesium silicate in order to attain sufficient porosity at the baking temperatures stated. The proportional use of preliminarily baked mass components, obtained particularly by previous fusion in an electric arc, promotes, moreover, porosity.

The degree of porosity of the masses suited for the new process has an upward limit of approximately 40 per cent by volume. If this limit is appreciably exceeded, the mechanical strength of such masses becomes so low that such fusions cannot be used any more for mechanically stressed articles, though they may be successfully employed for instance in vacuum vessels if another part of the apparatus is subjected to the stresses.

It is advisable to provide the porous ceramic fusion body having for instance the shape of a plate with holes, sunk holes or lattice-like openings in which the glass is embedded during superfusing. In this way, absolutely firm seating of the glass on the ceramic body is attained, even at relatively great deviation of the coefficients of expansion. If necessary for electrical reasons, box-like or tubular molded bodies made of vitrified substances may for instance be inserted and combined with the molded porous body by glass or glaze fusions.

The process according to the invention can be applied wherever glass walls subjected to higher temperatures are to be strengthened. This is done by fusing into or onto the glass wall porous ceramic insertions of corresponding form.

Particularly in electric discharge vessels of all sorts masses according to the invention can be advantageously used, since they are low in dielectric losses. As stated above, in larger articles the glass serves for sealing the vacuum, and the molded ceramic body constitutes the reinforcement of this sealing glass layer and the rigid support for the metallic ducts. Evacuation is easily accomplished, since the porous body can give off all gas constituents contained therein towards the vacuum space. If in such instances a ceramic sealing member of vitrified material cannot be dispensed with, a molded porous ceramic member is preferably used in addition and in such manner that the porous member arranged inside the vacuum vessel is rigidly fused by means of glass or glaze with the vitrified member or directly with glass portions of the vessel.

In the production of discharge vessels the previously mentioned clearances in the molded porous ceramic body can be used for leading therethrough the necessary electric conductors. In this respect the employment of porous ceramic material affords the added advantage that the glass required for sealing can be adapted as to expansion within wide limits to the metal of the conductors, as absolutely accurate conformity of the glass and the molded porous ceramic body is not necessary.

A few batches for porous ceramic bodies adapted to be fused with apparatus glass, low melting point lead glasses and particularly with so-called molybdenum glasses are stated below:

*Example 1*

| | Percent |
|---|---|
| Alumina, pure | 40 |
| Magnesite | 10 |
| Clay body | 50 |

*Example 2*

| | Percent |
|---|---|
| Alumina, pure | 60 |
| Magnesite | 30 |
| Clay body | 10 |

*Example 3*

| | Percent |
|---|---|
| Spinel MgO.Al$_2$O$_3$ | 60 |
| Magnesite | 30 |
| Clay body | 10 |

*Example 4*

| | Percent |
|---|---|
| Magnesium silicate, pre-fired | 40 |
| Magnesium silicate, crude | 20 |
| Silicic anhydride | 20 |
| Clay body | 15 |
| Alkaline earth carbonate | 5 |

Examples of the dense spinel masses, also mentioned above, which disclose great mechanical strength and low dielectric loss, are the following:

*Example 1*

| | Parts by weight |
|---|---|
| Spinel | 75 |
| Soapstone | 17 |
| Bentonite | 6 |
| Calcium carbonate | 3 |

*Example 2*

| | Parts by weight |
|---|---|
| Spinel | 60 |
| Clay body | 28 |
| Soapstone | 8 |
| Ba-carbonate | 4 |

*Example 3*

| | Parts by weight |
|---|---|
| Spinel | 80 |
| Clay | 9 |
| Bentonite | 9 |
| Soapstone | 2 |

*Example 4*

| | Parts by weight |
|---|---|
| Spinel | 60 |
| MgO | 20 |
| Clay body | 10 |
| Soapstone | 10 |

The invention is not limited to the modes of proceeding and performances described in detail, but may be varied in various ways without deviating from its fundamental ideas.

I claim:

1. A composite body consisting in part of a glass member of easily fused lead glass fused to a member of a ceramic material containing at least two constituents of the system MgO-Al$_2$O$_3$-SiO$_2$ having a coefficient of thermal extension of between 6 and 10×10$^{-6}$.

2. A composite body consisting in part of a glass member of easily fused lead glass fused to a member of a ceramic material belonging to the system MgO-Al$_2$O$_3$-SiO$_2$ having a coefficient of thermal extension of between 6 and 10×10$^{-6}$.

3. A composite body consisting in part of a glass member of easily fused lead glass fused to a member of ceramic material consisting of magnesia spinel and a remainder containing clay substance, the ceramic material having a coefficient of thermal extension of between 6 and 10×10$^{-6}$.

4. A composite body consisting in part of a glass member of easily fused lead glass fused to a member of a ceramic material containing at least two constituents of the system MgO-Al$_2$O$_3$-SiO$_2$ having a coefficient of thermal extension of between 6 and 10×10$^{-6}$, the ceramic material having a porosity of between 10 and 40%.

5. A composite body consisting in part of a glass member of easily fused lead glass fused to a member of a ceramic material belonging to the system MgO-Al$_2$O$_3$-SiO$_2$ having a coefficient of thermal extension of between 6 and 10×10$^{-6}$, the ceramic material having a porosity of between 10 and 40%.

6. A composite body consisting in part of a glass member of easily fused lead glass fused to a member of ceramic material consisting of magnesia spinel and a remainder containing clay substance, the ceramic material having a coefficient of thermal extension of between 6 and 10×10$^{-6}$ and having a porosity of between 10 and 40%.

7. A composite body according to claim 6, the porous body containing excess MgO.

8. A composite body according to claim 4, the surface of the porous body being provided with recesses where the glass is to be fused thereto.

9. A composite body according to claim 5, the surface of the porous body being provided with recesses where the glass is to be fused thereto.

10. A composite body according to claim 6, the surface of the porous body being provided with recesses where the glass is to be fused thereto.

ALFRED UNGEWISS.